(12) United States Patent
Pratt, Jr.

(10) Patent No.: US 12,202,350 B2
(45) Date of Patent: Jan. 21, 2025

(54) UNMANNED AERIAL VEHICLE AND METHOD OF TARGETED PACKAGE DELIVERY

(71) Applicant: Robert Irving Pratt, Jr., El Cajon, CA (US)

(72) Inventor: Robert Irving Pratt, Jr., El Cajon, CA (US)

( * ) Notice: Subject to any disclaimer, the term of this patent is extended or adjusted under 35 U.S.C. 154(b) by 192 days.

(21) Appl. No.: 17/822,662

(22) Filed: Aug. 26, 2022

(65) Prior Publication Data
US 2022/0411056 A1 Dec. 29, 2022

Related U.S. Application Data

(63) Continuation of application No. PCT/US2021/019689, filed on Feb. 25, 2021.
(Continued)

(51) Int. Cl.
*B64D 37/04* (2006.01)
*B60L 8/00* (2006.01)
*B60L 50/60* (2019.01)
*B64B 1/62* (2006.01)
*B64U 50/19* (2023.01)
(Continued)

(52) U.S. Cl.
CPC ............... *B60L 50/66* (2019.02); *B60L 8/003* (2013.01); *B64B 1/62* (2013.01); *B64D 37/04* (2013.01); *B64U 50/19* (2023.01); *G05D 1/0094* (2013.01); *G05D 1/101* (2013.01); *G05D 1/12* (2013.01); *G06Q 10/08* (2013.01); *B60L 2200/10* (2013.01); *B64U 10/30* (2023.01); *B64U 50/37* (2023.01); *B64U 80/00* (2023.01);
(Continued)

(58) Field of Classification Search
CPC ........ B64D 37/04; B64U 50/19; B64U 10/30; B64U 2101/64; G05D 1/0094; G05D 1/101; B60L 2200/10; B64B 1/58
See application file for complete search history.

(56) References Cited

U.S. PATENT DOCUMENTS

| 11,066,145 | B1 * | 7/2021 | Brutoco ................. B64U 70/20 |
| 2015/0359184 | A1 * | 12/2015 | Goelet ..................... B64B 1/22 244/30 |
| 2021/0129983 | A1 * | 5/2021 | Ratti ...................... B64U 10/30 |

FOREIGN PATENT DOCUMENTS

| CN | 106742013 A | 5/2017 |
| RU | 110592 U1 | 11/2011 |

(Continued)

OTHER PUBLICATIONS

International Search Report for International Application No. PCT/US2021/019689 dated May 20, 2021.

*Primary Examiner* — Peter D Nolan
*Assistant Examiner* — Roy Rhee
(74) *Attorney, Agent, or Firm* — Knobbe Martens Olson & Bear LLP

(57) ABSTRACT

An unmanned aerial vehicle ("UAV") having an envelope and a drone body capable of delivering packages is disclosed. Methods for utilizing UAVs to deliver packages and systems for housing UAVs are also disclosed. In one aspect, a UAV includes a dual cavity envelope having an ellipsoid shape with a first internal cavity and a second internal cavity, the first internal cavity configured to hold a lighter than air gas, the second internal cavity configured to hold a heated gas, and a drone body attached to and located below the dual cavity vertical envelope.

18 Claims, 6 Drawing Sheets

Related U.S. Application Data

(60) Provisional application No. 62/982,527, filed on Feb. 27, 2020.

(51) Int. Cl.
| | | |
|---|---|---|
| *G05D 1/00* | (2006.01) | |
| *G06Q 10/08* | (2023.01) | |
| *B64U 10/30* | (2023.01) | |
| *B64U 50/37* | (2023.01) | |
| *B64U 80/00* | (2023.01) | |
| *B64U 80/86* | (2023.01) | |
| *B64U 101/10* | (2023.01) | |
| *B64U 101/30* | (2023.01) | |
| *B64U 101/64* | (2023.01) | |

(52) U.S. Cl.
CPC .......... *B64U 80/86* (2023.01); *B64U 2101/10* (2023.01); *B64U 2101/30* (2023.01); *B64U 2101/64* (2023.01)

(56) References Cited

FOREIGN PATENT DOCUMENTS

| RU | 2600556 C1 | 10/2016 |
|---|---|---|
| RU | 2678523 C1 | 1/2019 |

* cited by examiner

UNMANNED AERIAL VEHICLE AND METHOD OF TARGETED PACKAGE DELIVERY

PRIORITY APPLICATIONS

This application is a continuation of International Application No. PCT/US2021/019689, filed Feb. 25, 2021, which claims priority to U.S. Provisional App. No. 62/982,527, filed Feb. 27, 2020, each of which is incorporated herein by reference. Any and all applications for which a foreign or domestic priority claim is identified in the Application Data Sheet as filed with the present application are hereby incorporated by reference under 37 CFR 1.57.

BACKGROUND

Field of the Disclosure

The present disclosure relates to an unmanned aerial vehicle ("UAV") with a dual cavity envelope and a drone body capable of delivering packages to targeted destinations. This disclosure also describes methods for utilizing the UAVs to deliver packages and methods to house the UAVs in fulfillment centers.

Description of the Related Art

With e-commerce and mail-order companies gaining a larger hold of the marketplace, fast, reliable package delivery is of critical importance. Many companies package together various groups of items into single shipments to fulfill single user orders. Internet and brick-and-mortar retailers and wholesalers maintain large inventories of a variety of items, allowing them to rapidly handle customer orders.

Most deliveries are packaged in corrugated cardboard and delivered straight to a customer's residence or place of business. While package delivery has improved over the past century, with air freight and efficient delivery systems allowing for rapid delivery, the final portion of each delivery system is handled with in-person deliveries. Physical items are taken by bike or truck to the customer's residence from a fulfillment center, with a human loading the package onto the vehicle and delivering the vehicle to the customer's door.

SUMMARY

The present disclosure relates to an unmanned aerial vehicle ("UAV") with a dual cavity upright envelope and a drone body capable of delivering packages to targeted destinations. The dual cavity upright envelope contains two separate lift gases, such as helium and hot air, providing lift and reducing strain on the drone component of the UAV. The drone body contains propellers to provide thrust vectoring, and an image capture device and electronics and communications array provide pinpoint guidance for the drone to targeted locations at the customer's address for package delivery. The storage compartment of the UAV safely contains the cargo until it reaches the destination, utilizing air bladders and film heaters to ensure the package is delivered to the customer in optimal condition.

This disclosure also describes methods for utilizing the UAVs to deliver packages and methods to house the UAVs in fulfillment centers. The method for delivering packages may eliminate or reduce the human component in cargo delivery, automating the process of receiving an order from the customer, picking up the delivery from the fulfillment center, delivering the parcel, and returning to the fulfillment center. The method to house the UAVs provides a way to gather the delivery drones in one location where they can be charged, refueled, and easily housed until they are needed for a new delivery.

BRIEF DESCRIPTION OF THE DRAWINGS

The novel features believed characteristic of the advantageous embodiments are set forth in the appended claims. The advantageous embodiments however, as well as a preferred mode of use, further objectives and advantages thereof, will best be understood by reference to the following detailed description of an advantageous embodiment of the present disclosure when read in conjunction with the accompanying drawings, wherein:

While implementations are described herein by way of example, those skilled in the art will recognize that the implementations are not limited to the examples or drawings described. It should be understood that the drawings and detailed description thereto are not intended to limit implementations to the particular form disclosed, but, on the contrary, the intention is to cover modifications, equivalents, and alternatives falling within the spirit and scope as defined by the appended claims. As used throughout this application, the word "may" is used in a permissive sense (i.e., meaning having the potential to) rather than the mandatory sense (i.e., meaning must). Similarly, the words "include", "including", and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION OF THE PREFERRED EMBODIMENT

Figure 1:
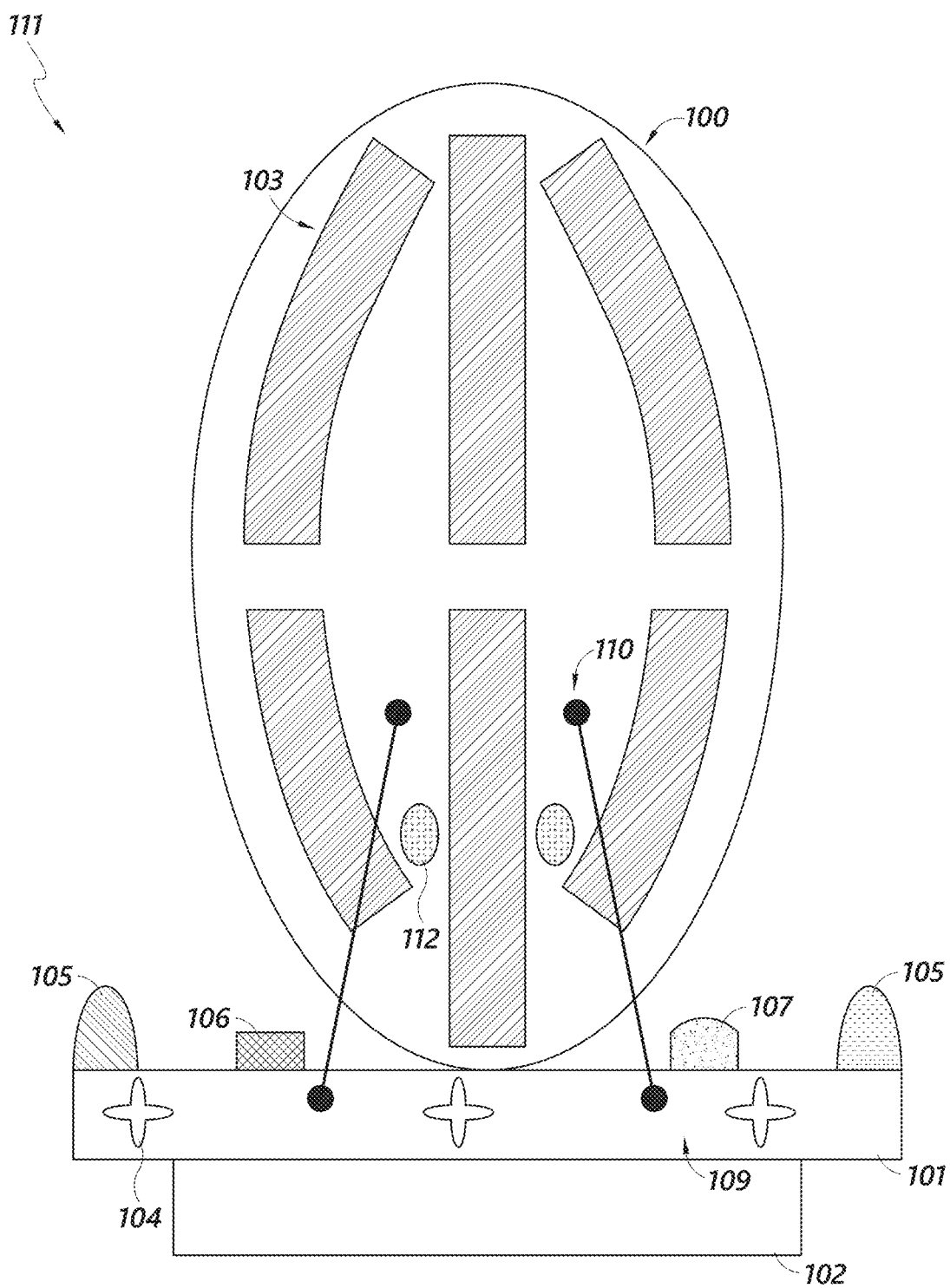
FIG. 1 is a diagram of the exterior of the UAV.

With reference now to the figures and in particular with reference to FIG. 1, a diagram of a UAV is depicted with an advantageous embodiment. UAV 111 includes upright envelope 100, drone body 101, and storage compartment 102.

The exterior of the upright dual cavity envelope may include solar panels 103, sealable air vents 112, and an envelope retraction system 110. Although the examples described herein may refer to an upright dual cavity envelope, these examples can apply to an upright cavity (or a horizontal cavity or an intermediate cavity) envelope with a different number of cavities. For example, these examples could apply to an upright cavity envelope with 1, 3, 4, 5, 6, 7, 8, 9, or 10 cavities in addition to the upright dual cavity envelope. Furthermore, these examples can apply to a horizontal cavity envelope and to a cavity envelope that can transition between upright and horizontal. The solar panel array 103 may be implemented to charge batteries 106. The batteries 106 can be used to provide power to the electrical components of the UAV 111. For example, the batteries 106 can provide power to the electric motors 109, which in turn can power to the propellers 104 to provide thrust vectoring for the UAV 111. The solar panels 103 can provide additional power to the batteries 106, extending the overall range of the UAV 111. The solar panel array 103 may also provide direct power to the electrical components of the UAV 111, such as, for example, the electric motors 109. In some embodiments of the invention, the lower half of the upright envelope 100 may contain sealable air vents 112 to allow the lower half of the envelope to deflate. In these embodiments, the lower half of the upright dual cavity envelope 100 is filled with a heated lift gas such as air. In some embodiments, the upright dual cavity envelope 100 may be additionally attached to the drone body 101 of the UAV through an envelope retraction system 110. In these embodiments, the lower half of the upright dual cavity envelope 100 is capable of deflating by venting lift gas through the sealable air vents 112, allowing the collapsed section of the upright dual cavity envelope 100 to compress.

The upright dual cavity envelope 100 is fixed to a drone body 101. The drone body 101, which is located underneath the upright dual cavity envelope 100, may include one or more propellers 104, an image capturing device containing image recognition software 105, one or more batteries 106, a fuel tank 107, an electronics and communications array 108, and one or more electric motors 109. The propellers 104 are used to provide thrust vectoring and stabilization of the UAV 111. The propellers 104 are powered by one or more electric motors 109 contained within the drone body 101. One or more batteries 106 power the electric motors 109 in addition to any electronics or devices attached to the UAV, such as the electronics and communications array 108 and image capturing device containing image recognition software 105. In some embodiments, a fuel tank 107 is attached to the exterior of the drone body. The fuel tank may contain a flammable fuel used to heat air in the lower cavity of the dual cavity envelope 100, creating a heated lift gas.

The image capturing device 105 is a digital camera with file storage capacity, and in some embodiments, a digital video recorder capable of taking still digital images with file storage capacity. The image capturing device 105 can contain, or be connected to, image recognition software, which allows for precision delivery of a package. The package recipient can upload a file (e.g. an image file) to the delivery company, which contains the exact location at the address (e.g. image of the delivery site) the recipient wishes the package to be delivered, and the image recognition software contained within the imagine capturing device 105 will match the delivery site image to the image captured by the digital camera or digital video recorder 105.

The electronics and communications array 108 may contain a GPS module, wireless communications system, gyroscope, accelerometer, magnetometer, barometer, sonar, optical flow, energy consumption and voltage meter, lift gas pressure sensors, lift gas temperature sensors, optical sensors, and a control unit for the UAV. The gyroscope, accelerometer, optical flow, GPS module, magnetometer, sonar, barometer, energy consumption and voltage meter, lift gas pressure sensors, and lift gas temperature sensors provide motor inputs, pitch, roll, height, obstacle detection, speed control, wind speed, and location and positioning data, which allows the UAV to deliver packages to precise locations. In some embodiments, the UAV can deliver a package to a location that is within a certain distance of a desired delivery location. For example, in some embodiments, the UAV can deliver a package within 1, 2, 3, 4, 5, 10, 15, 20 or 25 meters of the desired delivery location. In other embodiments, the UAV can deliver a package within 1, 2, 3, 4, 5, 6, 7, 8, 9, 10, 11, or 12 inches of a target location. In some embodiments, the optical sensors may aid in providing precise positioning data (e.g. positioning accuracy is within 0.01%, 0.1%, 1%, 5%, or 10% of the actual position). The control unit for the UAV processes the sensor data as well as the commands from the user at the fulfillment center. In some embodiments, the wireless communications system may be used to send digital code signals to open doors or deactivate security systems, allowing the UAV to access precise and secure delivery points of the package recipient's residence or place of business. For example, the wireless communications system can send a digital code to open and close a recipient's garage door, allowing the UAV 111 to access and deliver a package inside a user's garage and to close the garage door after making the delivery.

The drone body 101 is fixed to a storage container 102. The storage container 102 is located directly underneath the drone body 101.

Figure 2:
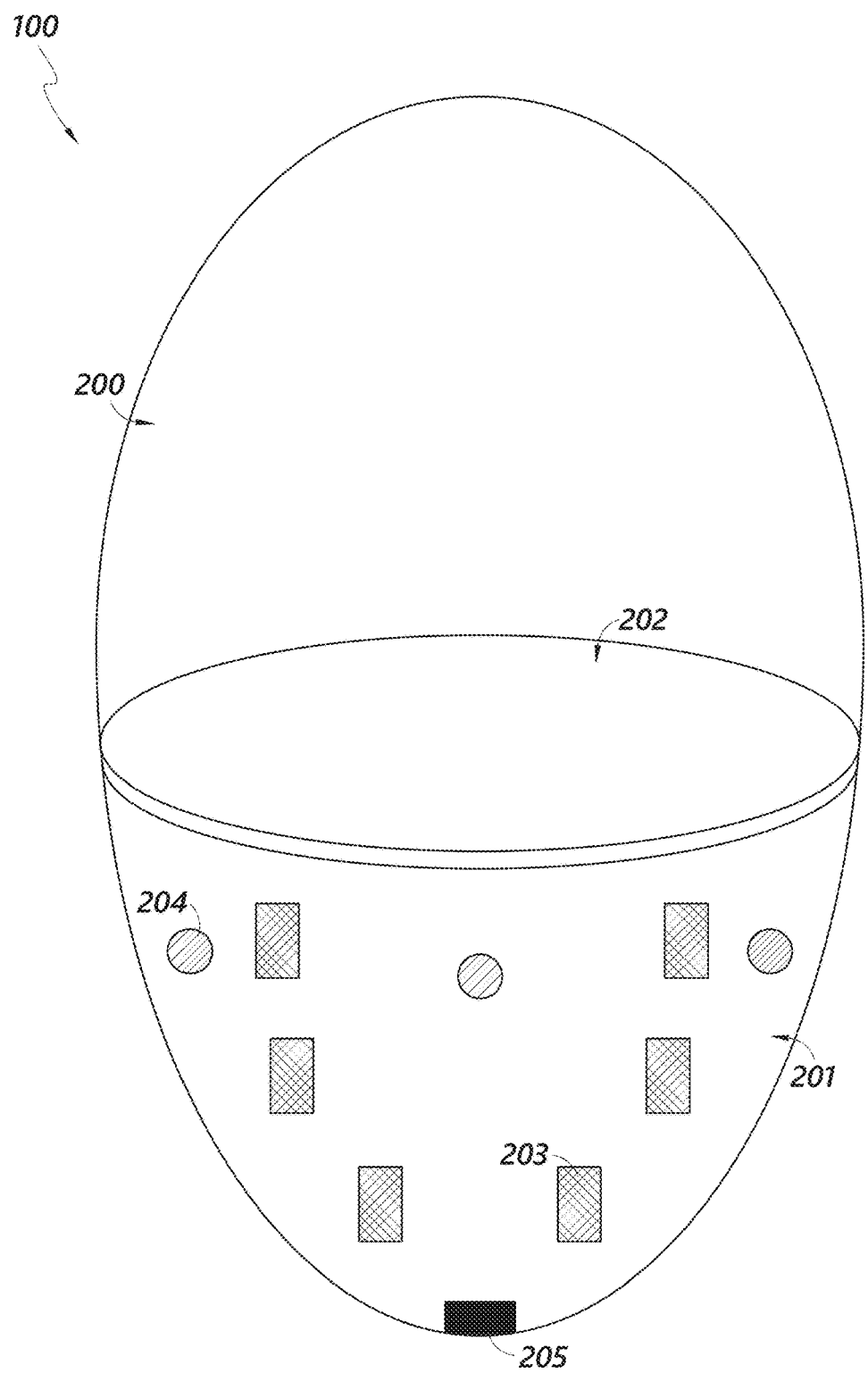
FIG. 2 is a diagram of the interior of the envelope of the UAV.

With reference now to FIG. 2, a diagram of the interior of the upright dual cavity envelope of the UAV is depicted in an advantageous embodiment. The interior of the upright envelope 100 contains two cavities separated by a non-permeable flexible barrier 202. The upper cavity 200 contains a lift gas, which in some embodiments, can be a gas lighter than air, such as helium or hydrogen. The lower cavity 201 contains a heated lift gas, such as air or in some embodiments, helium. Film heaters 203 are utilized to heat the gas within the lower cavity 201, generating a heated lift gas. In some embodiments, a flame source 205 may be used to generate hot air to provide a heated lift gas. The heated lift gas in the lower cavity 201 can be vented from the chamber through sealable air vents 204.

Figure 3:
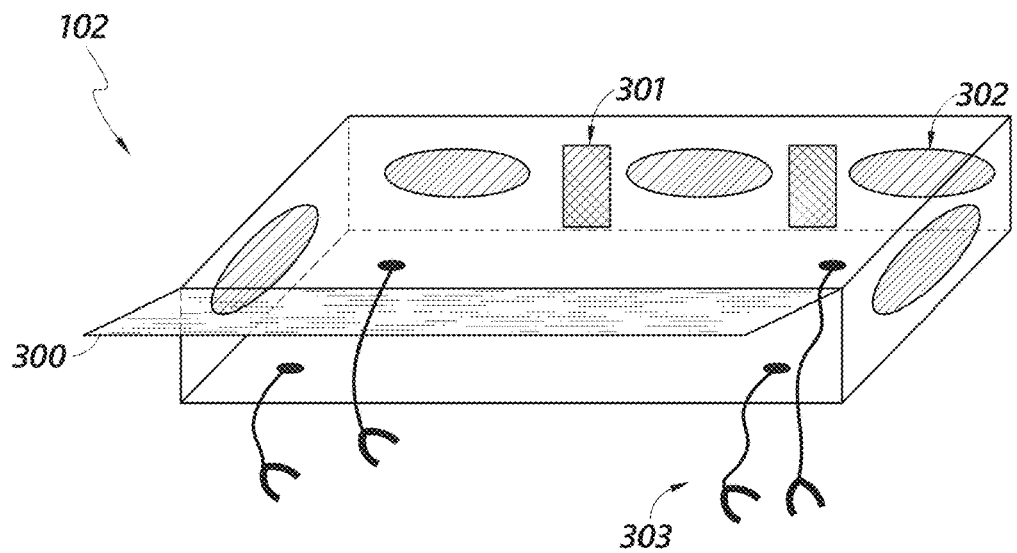
FIG. 3 is a diagram of the interior of the storage compartment of the UAV.

With reference now to FIG. 3, a diagram of the interior of the storage compartment of the UAV is depicted in an advantageous embodiment. The interior of the storage container 102 may contain a hatch 300, one or more film heaters 301, one or more air bladders 302, and a cargo retrieval and delivery apparatus 303. The hatch 300 can open to receive cargo and seal shut to prevent the cargo from falling out during delivery. In some embodiments, one or more film heaters 301 can be used to warm the storage compartment or ensure the cargo does not spoil or maintains certain desirable properties. One or more air bladders 302 may be employed in some embodiments to prevent the cargo from shifting during transit and prevent shock damage to fragile contents. In some embodiments, the air bladders 302 may be heated by one or more film heaters 301 to warm the interior of the storage compartment 102. A cargo retrieval and delivery apparatus 303 is used to retrieve packages from fulfillment centers, place the package within the storage compartment 102, and deliver the package to targeted locations.

Figure 4:
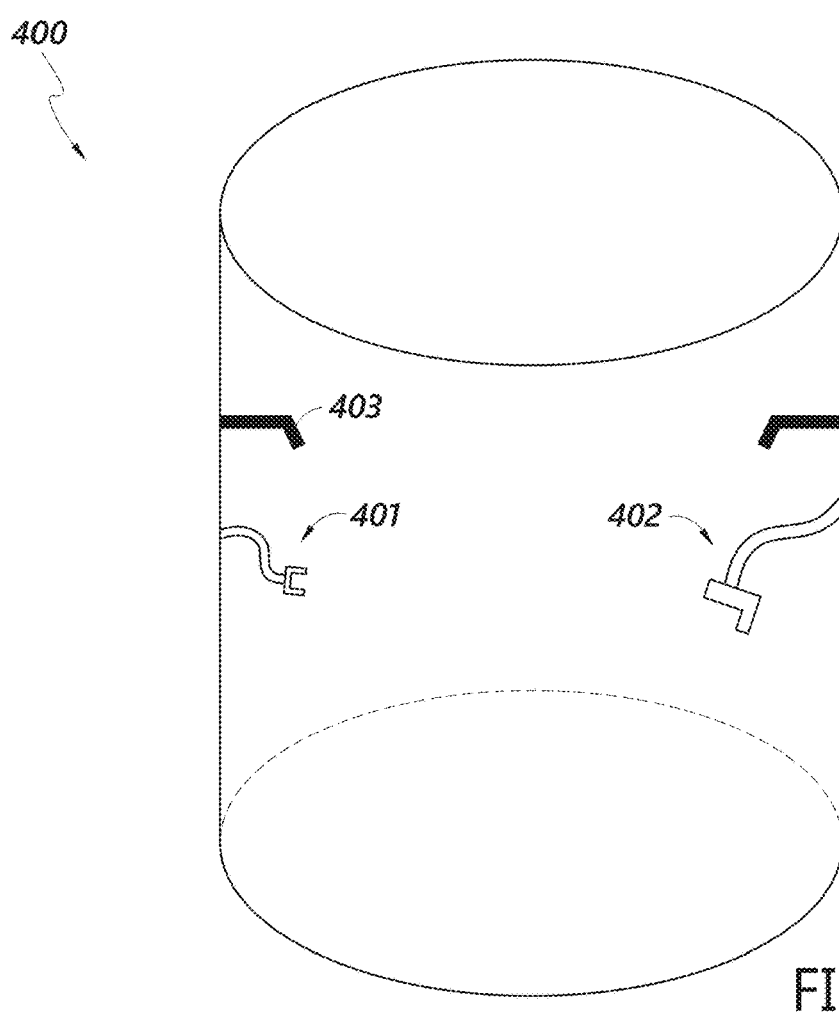
FIG. 4 is a diagram of the housing unit for the UAV.

With reference now to FIG. 4, a diagram of the housing unit is depicted in an advantageous embodiment. The housing unit 400 may contain one or more latches 403, a power charging cable 401, and a fuel delivery system 402. In some embodiments, the latches 403 may be used to secure the UAV to the housing unit while the UAV is at rest. In some embodiments, the power charging cable 401, attached to a power supply, may connect to and charge one or more batteries 106 on the UAV while the UAV is at rest. In some embodiments, the fuel delivery system 403, connected to a fuel source, may connect to and refuel one or more fuel tanks 107 on the UAV while the UAV is at rest.

Figure 5:
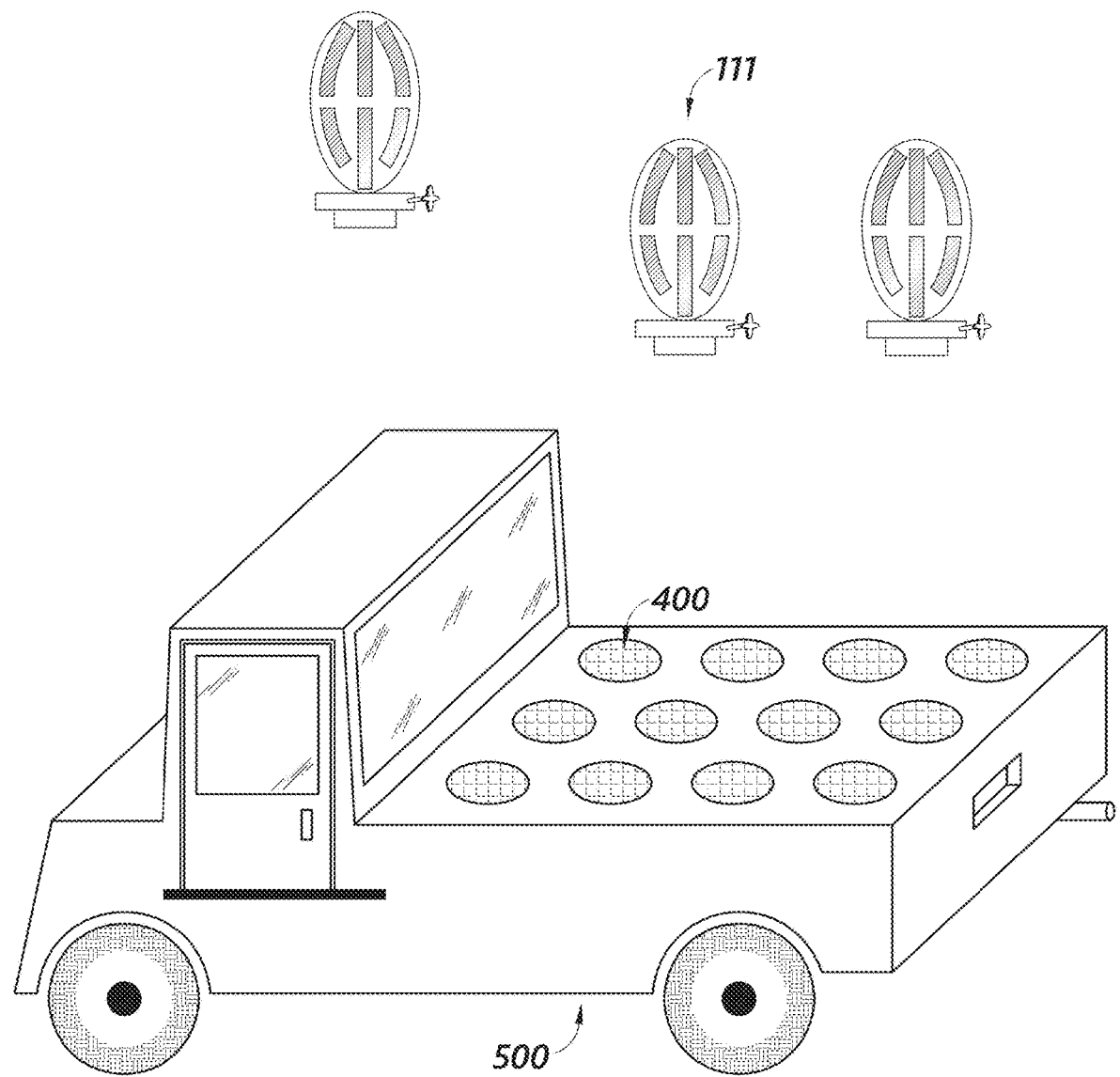
FIG. 5 is a diagram of the system of a housing unit and UAV on a mobile fulfillment center.

With reference now to FIG. 5, a diagram of the system of a housing unit and the UAV on a mobile fulfillment center is depicted in an advantageous embodiment. The mobile fulfillment center 500 can include or consist of a mobile vehicle (e.g. a truck) or a mobile storage unit (e.g. a trailer). The mobile fulfillment center 500 can travel or be transported to multiple locations within a city or region. The mobile fulfillment center 500 contains one or more housing units 400, each capable of holding a UAV 111. The mobile fulfillment center 500 can host multiple UAVs 111 while in transit.

Figure 6:
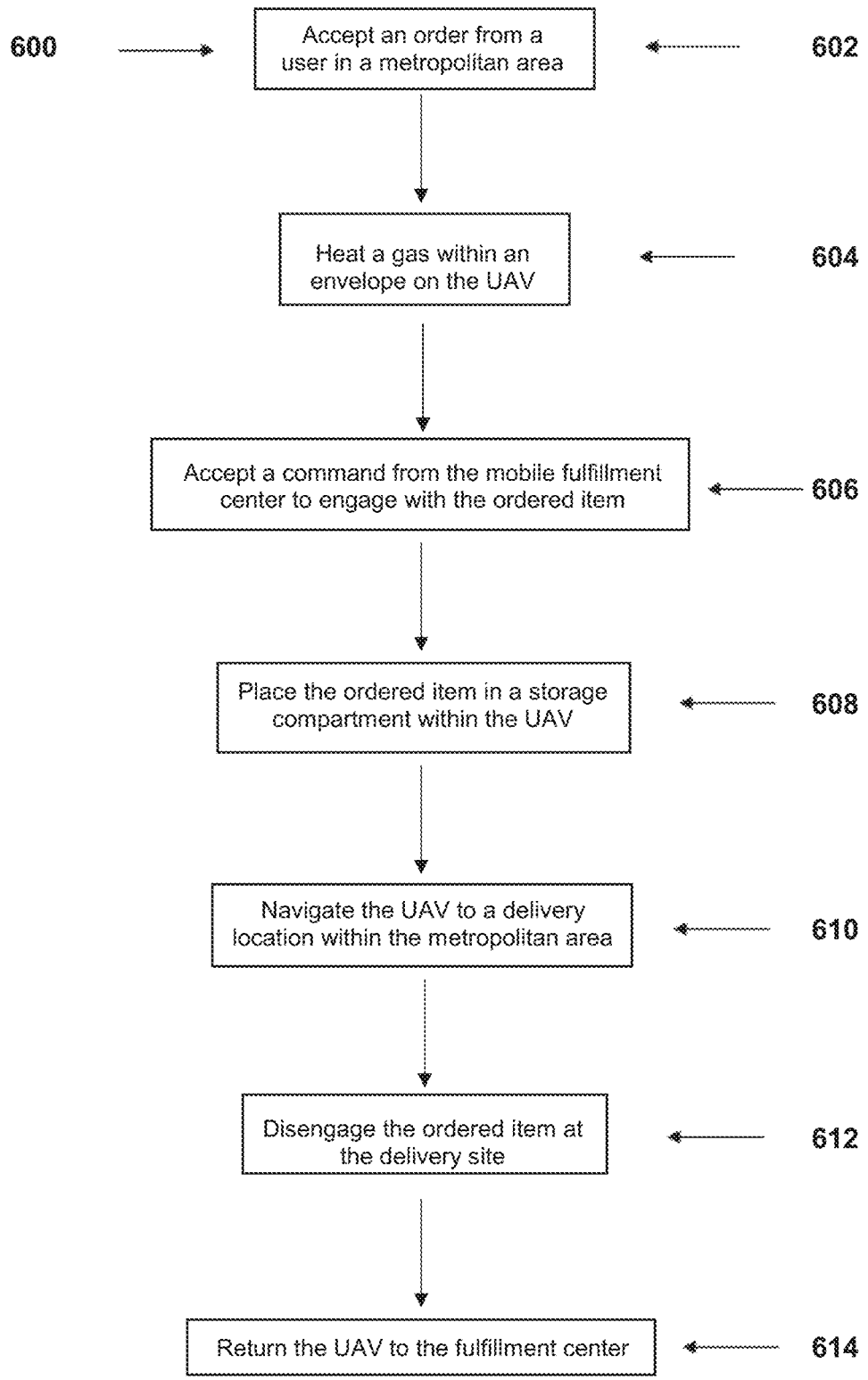
FIG. 6 is a diagram of the method of using the UAV to deliver packages.

With reference now to FIG. 6, a diagram of the method of using the UAV to deliver packages is depicted in an advantageous embodiment. The method 600 begins with step 602, where an order is accepted for an item from a user in a metropolitan area. Next, in step 604, a lift gas is heated within an envelope 100 on the UAV. The heated lift gas referred to in step 604 is the lift gas held within the lower or coaxial cavity inside the dual cavity envelope 100. After the lift gas is heated in step 604, the UAV accepts a command from the mobile fulfillment center to engage (e.g. retrieve or interact) with the ordered item in step 606. The ordered item in step 606 is the same item as referred to in step 602. The ordered item is next placed within a storage compartment 102 on the UAV in step 608, and the UAV then navigates to the delivery location within a metropolitan area in step 610. Upon arrival at the delivery location, the UAV disengages with and delivers the item in step 612, and finally, the UAV returns to the fulfillment center in step 614.

Figure 7:
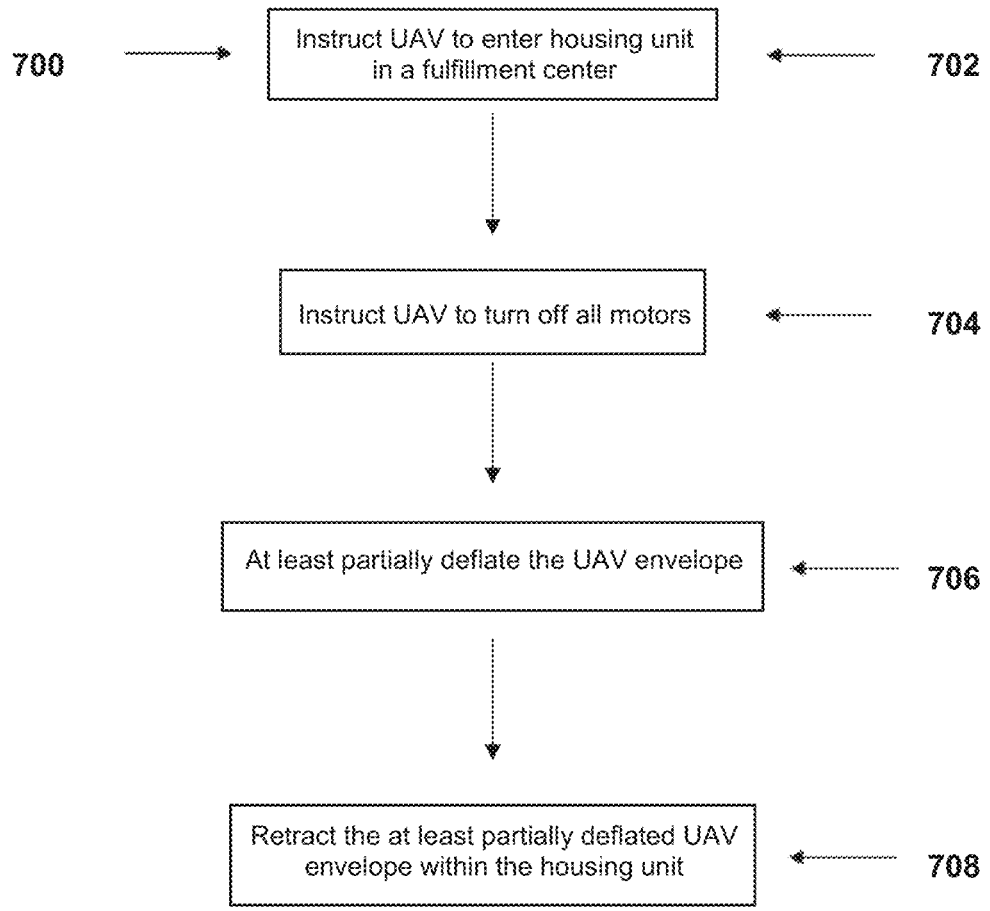
FIG. 7 is a diagram of the method of housing the UAV within a housing unit.

With reference now to FIG. 7, a diagram of the method of housing the UAV within a housing unit is depicted in an advantageous embodiment. The method 700 begins with step 702, where the UAV is instructed to enter a housing unit in a fulfillment center. Next, the UAV is instructed to turn off all of its one or more electric motors 109 in step 704. The UAV envelope 100 is at least partially deflated in step 706, and finally the at least partially deflated envelope 100 is retracted within the housing unit in step 708. In some embodiments, step 706 is optional, as the UAV envelope 100 may not partially deflate.

UAV

The UAV 111 may include, for example, a dual cavity vertical envelope 100 with an ellipsoid or spherical shape with a drone body 101 attached below the dual cavity vertical envelope and a storage compartment 102 affixed below the drone body. In various embodiments, the envelope 100 is arranged in a horizontal configuration (e.g. the envelope is installed on the drone body 101 such that the envelope 100 is more wide than tall). In other embodiments, the envelope 100 is arranged in an upright or vertical configuration (e.g. the envelope is installed on the drone body 101 such that the envelope 100 is more tall than wide). In some embodiments, the envelope 100 can transition between the horizontal and vertical configuration through the use of servo motors or actuators. In some embodiments, dual cavity envelope 100 may be attached to the drone body 101 through wire cables affixed to the envelope and attached to the drone body with bolts. In other embodiments, the dual cavity envelope 100 may be attached to the drone body 101 with glue, rigid rods, Hellerman type seals, or a direct bolt from the vertical envelope. The envelope 100 is also affixed to the drone body 101 through an envelope retraction system 110. The retraction system 110 is operatively coupled to one or more batteries 106, one or more electric motors 109, the solar panel array 103, and the electronics and communications array 108. Persons of ordinary skill in the art will recognize suitable operative connections between the retraction system 110 and the one or more batteries 106, one or more electric motors 109, the solar panel array 103, and the electronics and communications array 108. The envelope retraction system 110, a set of wire cables connected to a gear system, can be activated through the electronics array 108 by a user, pulling the envelope closer to the drone body 101 for compact storage after use.

The storage compartment 102 may be affixed to the drone body 101 through bolts. In some embodiments, the storage compartment is connected to the drone body 101 through detachable hooks. In separate embodiments, the storage container 102 may be attached through solder, rivets, glue, or screws to the drone body 101.

Envelope

The dual cavity vertical envelope 100 is configured to hold two separate lift gases. In some embodiments, a lighter than air lift gas such as helium or hydrogen is held in the upper cavity and a heated lift gas such as hot air is held in the lower cavity. In other embodiments, the first unheated lift gas is in a central cavity and the second heated lift gas is in a coaxial cavity. In various embodiments, the envelope 100 contains one or more cavities (e.g. 3, 4, 5, 6, 7, 8, 9, or 10), which can hold the same gasses as other cavities or different types of gasses from other cavities. In some embodiments, the upper and lower cavities can consist of multiple cavities (e.g. two or more) arranged next to one another within the envelope 100. The one or more cavities in the envelope are separated by a flexible, impermeable barrier 202. The envelope may be made of any suitable material as long as it is lightweight and capable of containing helium or the like. In some embodiments, this material can be alternating sandwiched layers of 1.27 millimeter thick latex and aluminum coated PET. The dual cavity envelope 100 contains one or more sealable air vents 204 configured to allow the release of a heated lift gas from the lower cavity of the envelope 100. Persons of ordinary skill in the art will recognize suitable sealable air vents 204 for use with the application as disclosed herein. The air vents 204 are positioned on the dual cavity envelope such that lift gas can only be vented from the lower cavity, not the upper cavity. The dimensions of the envelope may vary from 0.25 m to 1.50 m at the longest dimension of the ellipsoid and 0.15 m to 1.30 m at the shorter dimension. The volume of the gas required to fill the envelope depends on the dimensions and the adequate level of pressure needed to perform specific airship functions. For example, in some embodiments, to the envelope needs sufficient gas to counteract the weight of the UAV (e.g. the weight of the UAV is less than the buoyancy created by the gas in the envelope).

In some embodiments, the lift gas in the lower cavity of the envelope 100 is heated with film heaters 203 located on the interior of the envelope. One or more film heaters 203 may be disposed on various interior portions of the envelope 111 in a variety of different configurations. One advantageous configuration for the solar panels is shown in FIG. 2. Persons of ordinary skill in the art will recognize the requirements of film heaters suitable for the applications disclosed herein. In other embodiments, the lift gas in the lower cavity of the envelope 100 is heated with a flame source 205. The flame source 205 is operatively coupled to one or more fuel tanks 107. Persons of ordinary skill in the art will recognize suitable operative connections between the one or more fuel tanks 107 and flame source 205.

Solar Panels

One or more solar panels 103 may be disposed on various portions of the UAV 111 in a variety of different configurations. One advantageous configuration for the solar panels is shown in FIG. 1. Persons of ordinary skill in the art will recognize the requirements of solar panels suitable for the applications disclosed herein. Further, the disclosed configurations and placement of solar panels shown and discussed herein are not intended to be limiting, and persons of ordinary skill in the art will understand that additional embodiments are possible. Solar panels 103 may be operatively coupled to one or more batteries 106, envelope retraction system 110, electronics and communications array 108, the image capturing device containing image recognition software 105, one or more film heaters 203, one or more air bladders 302, cargo delivery and retrieval apparatus 303, one or more sealable air vents 204, and/or one or more electric motors 109, and configured to supply power to the one or more electric motors, film heaters, and/or cargo delivery and retrieval apparatus. One or more batteries 106 may be configured to receive and store electrical energy supplied by solar panels 103. Persons of ordinary skill in the art will recognize suitable operative connections between solar panels 103 and one or more batteries 106, envelope retraction system 110, electronics and communications array 108, the image capturing device containing image recognition software 105, one or more film heaters 203, one or more air bladders 302, cargo delivery and retrieval apparatus 303, one or more sealable air vents 204, and/or one or more electric motors 109 according to the arrangements disclosed.

Drone Body

Carbon fiber may be used as a material for the drone body frame, one or more battery holders, one or more fuel tank holders, one or more propellers 104, landing gear, and storage compartment components in order to achieve a light weight while maintaining UAV durability. In other embodiments, the drone body frame, battery holders, landing gear, one or more fuel tank holders, one or more propellers 104, and storage compartment components may be created from aluminum, plastic, or thin sheet steel.

The landing gear contains two parts on each of four legs. One part is fixed to the lower base plate and is immovable, and the other part moves and can be retracted 90 degrees up to the center of the landing gear. Retraction can be performed manually (by a human) or automatically, using servo motors for moving the joints. Manually retractable landing gear can be used in other embodiments.

The frame contains two base plates and one or more battery container receptacles. In some embodiments, the frame also contains one or more fuel tank receptacles. The drone body frame may include one or more propellers 104 and one or more electric motors 109. The one or more propellers 104 are operably connected to and powered by the one or more electric motors 109. In some embodiments, the propellers 104 are powered by one or motors 109 that utilize a fuel source besides electricity. For example, the motors 109 can be fueled by gasoline, compressed air, natural gas, hydrogen fuel cells, diesel fuel, and other types of fuel sources. A person of ordinary skill in the art will recognize suitable operable connections between the one or more propellers 104 and the one or more electric motors 109. The propellers 104 provide thrust vectoring for the UAV 111 and are controlled through the electronics and communications array 108. The propellers are operably connected to the electronics and communications array 108. A person of ordinary skill in the art will recognize suitable operable connections between the one or more propellers 104 and the electronics and communications array 108. The upper base plate is also used for providing the controller with additional equipment, such as a GPS antenna or telemetry antenna in the electronics and communications array 108 and image capture equipment 105.

Each battery 106 sits in a quick-change container, which is a 240 millimeter-long carbon tube with an 82 millimeter radius and a 2 millimeter thickness. Those sizes allow a user to insert a 6S 30C Lithium-polymer battery with an 8 Ah capacity. Also, the container can have a connector to lock onto the receptacle part on the frame in a "turn and attach" manner. Each battery 106 is constructed from various lightweight battery technologies which be employed to minimize any reduction in airship performance due to the added weight of each battery 106. Persons of ordinary skill in the art will readily recognize lightweight battery technologies that may be suitable for applications disclosed herein. Each of the one or more batteries 106 may be configured to provide electrical power to the envelope retraction system 110, one or more film heaters 203, one or more air bladders 302, cargo delivery and retrieval apparatus 303, one or more sealable air vents 204, and/or one or more electric motors 109 according to the arrangements disclosed. Persons of ordinary skill in the art will recognize suitable operative connections between each battery 106 and the envelope retraction system 110, electronics and communications array 108, the image capturing device containing image recognition software 105, one or more film heaters 203, one or more air bladders 302, cargo delivery and retrieval apparatus 303, one or more sealable air vents 204, and/or one or more electric motors 109 according to the arrangements disclosed.

The flight controller and additional communication equipment 108 as well as the image capture device 105 are placed on the top of vehicle on the upper base plate. The main motor power bus is divided into two independent segments, each segment wired by 16 AWG wires to the frame and used to power a group of one or more motors independently. The flight controller, electronics, and communication equipment 108 is operatively connected to the image capturing device containing image recognition software 105, each battery 106, the envelope retraction system 110, electronics and communications array 108, the image capturing device containing image recognition software 105, one or more film heaters 203, one or more air bladders 302, cargo delivery and retrieval apparatus 303, one or more sealable air vents 204, and/or one or more electric motors 109. Persons of ordinary skill in the art will recognize suitable operative connections between the flight controller, electronics, and communication equipment 108 is operatively connected to the image capturing device containing image recognition software 105, each battery 106, the envelope retraction system 110, electronics and communications array 108, the image capturing device containing image recognition software 105, one or more film heaters 203, one or more air bladders 302, cargo delivery and retrieval apparatus 303, one or more sealable air vents 204, and/or one or more electric motors 109. The electronics and communications array 108 may contain a GPS module, wireless communications system, gyroscope, accelerometer, magnetometer, barometer, sonar, optical flow, energy consumption and voltage meter, lift gas pressure sensors, lift gas temperature sensors, optical sensors, and a control unit for the UAV. The gyroscope, accelerometer, optical flow, GPS module, magnetometer, sonar, barometer, energy consumption and voltage meter, lift gas pressure sensors, and lift gas temperature sensors can provide data to the electronics and communications array 108 in some embodiments.

Storage Compartment

The storage compartment 102 is configured to contain packages. As used herein, the terms "cargo" and "package" are intended to encompass anything carried by UAV 111 that are not a part of UAV 111. For example, the terms "cargo" and "package," as used herein, refer to freight. The storage compartment may be of any suitable size to accommodate a package between 0.01 kg and 4.00 kg in overall weight. In some embodiments, the storage compartment 102 includes or consists of a lightweight packaging system. For example, the storage compartment 102 may contain one or more cargo nets containing packages. In some embodiments, the lightweight packaging includes or consists of cargo encapsulated within an airbag or air pads positioned around the cargo. The lightweight packaging can attach and be detached to the UAV 111 through an actuated hook. A hook, or fastener, that releases cargo, or a package, when signaled to do so. The package may include an enclosure that is made to be lightweight, with components such as net, foam, air bubble material, and/or similar items, that protect the contents from weather elements, temperature excursions and dynamic and impact loads that can be present during delivery and storage. In some embodiments, the storage compartment may contain film heaters 301 and air bladders 302 to keep the package in optimum condition during the delivery process. The film heaters 301, hatch 300, and air bladders 302 may be operatively connected to the electronics and communications array 108. Persons of ordinary skill in the art will recognize suitable operative connections between the electronics and communications array 108 and the cargo retrieval and delivery system 303, each film heater 301, hatch 300, and each air bladder 302. The cargo retrieval and delivery system 303, a connected system of clamps affixed to the end of wire cables attached to a winch contained within the storage compartment 102, is operatively connected to one or more electric motors 109. Persons of ordinary skill in the art will recognize suitable operative connections between the one or more electric motors 109, electronics and communications array 108, and hatch 300 and the cargo retrieval and delivery system 303. The hatch can open and close with user command or internal command, granting access to the interior of the storage compartment 102.

Image Capture Device

The image capture device 105 is a digital camera with file storage capacity, and in some embodiments, a digital video recorder capable of taking still digital images with file storage capacity. The image capturing device 105 contains image recognition software, allowing for precision package delivery or proof of delivery. The package recipient can upload a file to the delivery company for the exact location at the address the recipient wishes the package to be delivered, and the image recognition software contained within 105 will match the delivery site image to the image captured by the digital camera or digital video recorder 105. The image capture device is operably connected to the solar panels 103, one or more batteries 106, and electronics and communications array 108. A person of ordinary skill in the art will recognize suitable operative connections between the solar panels 103, one or more batteries 106, and electronics and communications array 108.

The computer used to control the operations, execute routines and store data, included within the electronic and communications array 108, may comprise at least one or more processors and memory storage devices. The computer also may receive a number of inputs and outputs for communicating information externally.

A person of ordinary skill in the art will recognize suitable computers which are capable of operating the image capture device 105 as well as control the operating system and image recognition software applications, components and programs that execute the routines and systems. In general, the routines executed to implement the embodiments of the invention, whether implemented as part of an operating system or a specific application, component, program, object, module or sequence of instructions will be referred to herein as "software". The software controls the image acquisition, image storage, and image analysis. A person of ordinary skill in the art will recognize suitable software required to process incoming images of the UAV location to compare to the user-submitted images.

Housing Unit

A housing unit 400 may be, in some embodiments, operably connected to one or more latches 403, power transfer cable 401, and fuel delivery system 402. A person of ordinary skill in the art will recognize suitable operative connections between the housing unit 400 and the one or more latches 403, power transfer cable 401, and fuel delivery system 402. The power transfer cable 401 is operatively connected to an electrical power source located outside the housing unit 400. A person of ordinary skill in the art will recognize suitable operable connections between the power transfer cable 401 and an electrical power source. The fuel delivery system 402 is operatively connected to a fuel source located outside the housing unit 400. A person of ordinary skill in the art will recognize suitable operable connections between the fuel delivery system 402 and a fuel source. In some embodiments, the power transfer cable 401 and fuel delivery system 402 may be controlled through a computer at the fulfillment center. A person of ordinary skill in the art will recognize suitable computers for controlling a power transfer cable 401 and a fuel delivery system 402. In various embodiments, the housing unit 400 can download, upload, and store data. The housing unit 400 can contain a processor, memory, and a communications device, which permit the housing unit 400 to download, upload, and store data. In some embodiments, the housing unit 400 contains a memory bank, which allows for information received by the electronics and communication array 108 to be stored within the housing unit 400. A person of ordinary skill in the art will recognize suitable processors, memory units, communication devices, and software required for downloading, uploading, and storing data within the housing unit 400.

Delivery Methods

The method 600 begins with step 602, where an order is accepted for an item from a user in a metropolitan area. The item ordered in step 602 may be held at a mobile fulfillment center. In some embodiments, the item may be held at a stationary structure fulfillment center. Next, a lift gas is heated within an envelope 100 on the UAV in step 604. The heated lift gas referred to in step 604 is the lift gas held within the lower or coaxial cavity inside the dual cavity envelope 100. In some embodiments, the lift gas heated within the lower or coaxial cavity inside the dual cavity envelope 100 is air. After the lift gas is heated in step 604, the UAV accepts a command from the mobile fulfillment center to engage with the ordered item in step 606. In some embodiments, the fulfillment center is a stationary structure. The ordered item in step 606 is the same item as referred to in step 602. In some embodiments, the cargo retrieval and delivery apparatus 303 grabs the package and pulls it within the storage compartment 102.

The ordered item is next placed within a storage compartment 102 on the UAV in step 608, and the UAV then navigates to the delivery location within a metropolitan area in step 610. In some embodiments, one or more air bladders 302 and one or more film heaters 301 may be turned on to maintain the optimal condition for the package. The UAV disengages with and delivers the item in step 612, and finally the UAV returns to the fulfillment center in step 614. In some embodiments, the cargo retrieval and delivery apparatus 303 lowers the package to the ground. In some embodiments, the image capture device 105 captures a digital image of the delivered package to confirm the delivery. In some embodiments, the image capture device 105 takes digital photographs of the location and compares the images with the digital image submitted by the package recipient. Once the image detection software finds an image match above 95% at a GPS location matching the delivery address, the UAV 111 will deliver the package. A person of ordinary skill in the art will recognize suitable image detection software to accomplish the task disclosed in this application. In some embodiments, upon reaching the delivery location as confirmed by the GPS within the electronics and communications array 108, the electronics and communications array 108 will send a signal transmitting a security code, allowing the UAV access to the package recipient's garage, business, or home. Once the package is delivered, the electronics and communications array 108 may transmit a code to close the opened garage or other building. A person of ordinary skill in the art will recognize suitable wireless transmission devices for transmitting garage door entry codes or building entry codes.

In some embodiments, the UAV includes the ability to utilize situational awareness, which can include factors such as atmospheric conditions (for example, climate, wind, precipitation), traffic conditions, and time of time of day, with other intelligence as data inputs to provide guidance for the decision making that will result in the adoption of a collaborative system level strategy that is chosen to improve the likelihood of overall mission success. Elements of artificial intelligence may be utilized. These features may allow for both "smart" deployment and retrieval.

Housing Method

The method 700 begins with step 702, where the UAV is instructed to enter a housing unit in a fulfillment center. In some embodiments, the fulfillment center in step 702 may be mobile or a stationary structure. Next, the UAV is instructed to turn off all of its one or more electric motors 109 in step 704. The command to turn off each of the one or more UAV electric motors 109 is supplied in some embodiments from a user at the fulfillment center. The UAV envelope 100 is at least partially deflated in step 706, and finally the at least partially deflated envelope 100 is retracted within the housing unit in step 708. In some embodiments, the envelope 100 is not partially deflated before being entering into a fulfillment center. The heated lift gas held within the lower cavity, or in other embodiments the coaxial cavity, is the gas expelled during the 706 partial envelope deflation step through one or more sealable air vents 112. In some embodiments, after the drone has retracted the partially deflated envelope during step 708, a power transfer cable 401 may attach to the one or more batteries 106 on the UAV to recharge the batteries. In some embodiments, a fuel delivery system 402 may attach to the one or more fuel tanks 107 on the UAV to refill the tanks. In some embodiments, the UAV 111 may be secured within the housing unit 400 through one or more latches 403.

In some situations, the UAV 111 may be unable to return to the fulfillment center after making a delivery, or be unable to make a delivery after leaving a fulfillment center. In some situations, the UAV 111 may be unable to complete its task due to environmental issues (e.g. weather) or because the UAV 111 may be low on fuel or battery power (e.g. 10% battery life remaining). In some situations, the UAV 111 can enter into an emergency mode. While in the emergency mode, the UAV 111 can travel to a secure or nearby location (e.g. a safe nest) where the UAV 111 can safely land and be retrieved by a user at a later time. Landing at the safe nest can prevent the UAV 111 from crashing due to environmental factors, low power or fuel, or other complications with the UAV 111.

Although the invention has been described with reference to embodiments and examples, it should be understood that numerous and various modifications can be made without departing from the spirit of the invention. Accordingly, the invention is limited only by the following claims.

It is understood that this disclosure, in many respects, is only illustrative of the numerous alternative device embodiments. Changes may be made in the details, particularly in matters of shape, size, material and arrangement of various device components without exceeding the scope of the various embodiments of the invention. Those skilled in the art will appreciate that the exemplary embodiments and descriptions thereof are merely illustrative of the invention as a whole. While several principles of the invention are made clear in the exemplary embodiments described above, those skilled in the art will appreciate that modifications of the structure, arrangement, proportions, elements, materials and methods of use, may be utilized in the practice of the invention, and otherwise, which are particularly adapted to specific environments and operative requirements without departing from the scope of the invention. In addition, while certain features and elements have been described in connection with particular embodiments, those skilled in the art will appreciate that those features and elements can be combined with the other embodiments disclosed herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that when a feature or element is referred to as being connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (for example, compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (for example, where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether.

Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An unmanned aerial vehicle ("UAV"), comprising:
a dual cavity envelope having an ellipsoid shape with a first internal cavity and a second internal cavity, the first internal cavity configured to hold a lighter than air gas, the second internal cavity configured to hold a heated gas; and
a drone body attached to and located below the dual cavity vertical envelope.

2. The UAV of claim 1, wherein the vehicle contains an electronics and communications array containing wireless communications and GPS tracking devices.

3. The UAV of claim 1, further comprising an image capture device attached to the drone body and having both image detection and recognition software capable of distinguishing set delivery points.

4. The UAV of any of claim 1, further comprising a package delivery and storage toolkit attached below the drone body, and sized to house and/or deliver packages.

5. The UAV of claim 4, wherein the package delivery and storage toolkit includes storage compartment which can be heated by film heaters fixed in the storage compartment.

6. The UAV of any of claim 1, further comprising a set of solar panels attached directly to the envelope.

7. The UAV of claim 6, further comprising a set of batteries attached to the drone body of the UAV connected to the solar panels.

8. The UAV of claim 7, wherein the batteries contain a charging port.

9. The UAV of claim 1, further comprising a heating device contained within the envelope to generate heated lift gas.

10. The UAV of claim 9, further comprising a fuel tank connected to the drone body.

11. The UAV of claim 1, wherein the lighter than air gas is helium or hydrogen.

12. The UAV of claim 1, wherein a lower half of the dual cavity vertical envelope includes a sealable air vent.

13. The UAV of claim 1, wherein the dual cavity vertical envelope is connected to the drone body by an envelope retraction system.

14. A system, comprising:
the UAV of claim 1; and
a housing unit.

15. The system of claim 14, wherein the housing unit contains a power source, power transfer cable, and a power outlet.

16. The system of claim 14, further comprising the housing unit containing a fuel source and a fuel transfer system.

17. The system of claim 14, further comprising the housing unit contained on a mobile fulfillment center.

18. The system of claim 14, further comprising the housing unit contained in a stationary structure fulfillment center.

* * * * *

UNITED STATES PATENT AND TRADEMARK OFFICE
CERTIFICATE OF CORRECTION

| | | |
|---|---|---|
| PATENT NO. | : 12,202,350 B2 | Page 1 of 1 |
| APPLICATION NO. | : 17/822662 | |
| DATED | : January 21, 2025 | |
| INVENTOR(S) | : Robert Irving Pratt, Jr. | |

It is certified that error appears in the above-identified patent and that said Letters Patent is hereby corrected as shown below:

In the Claims

Column 15, Line 1, Claim 4, delete "of any of claim 1," and insert -- of claim 1, --.

Column 15, Line 7, Claim 6, delete "of any of claim 1," and insert -- of claim 1, --.

Signed and Sealed this
Twentieth Day of May, 2025

Coke Morgan Stewart
*Acting Director of the United States Patent and Trademark Office*